US012574271B2

(12) United States Patent
Montazeri et al.

(10) Patent No.: US 12,574,271 B2
(45) Date of Patent: Mar. 10, 2026

(54) FREQUENCY SHIFT KEYING (FSK)-MODULATED SIGNAL DISCRIMINATION

(71) Applicant: Intel Corporation, Santa Clara, CA (US)

(72) Inventors: Ali Montazeri, San Jose, CA (US); Jinyong Lee, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 829 days.

(21) Appl. No.: 17/561,877

(22) Filed: Dec. 24, 2021

(65) Prior Publication Data

US 2023/0208689 A1 Jun. 29, 2023

(51) Int. Cl.
H04L 27/144 (2006.01)
H04B 1/10 (2006.01)

(52) U.S. Cl.
CPC ............. H04L 27/144 (2013.01); H04B 1/10 (2013.01)

(58) Field of Classification Search
CPC ......... H04B 1/10; H04L 27/144; H04L 27/22; H04L 27/0012; H04L 27/10
See application file for complete search history.

(56) References Cited

U.S. PATENT DOCUMENTS

| | | | | |
|---|---|---|---|---|
| 7,428,270 B1* | 9/2008 | Dubuc | ................ | H04L 27/0012 455/226.1 |
| 2004/0247064 A1* | 12/2004 | Yang | ................... | H04L 27/2331 375/350 |
| 2007/0205872 A1* | 9/2007 | Kim | ................... | H04W 52/0229 455/343.1 |
| 2015/0030061 A1* | 1/2015 | de Ruijter | ............. | H04W 56/00 375/226 |
| 2015/0131683 A1* | 5/2015 | de Ruijter | ........... | G06F 13/4295 370/514 |
| 2020/0162306 A1* | 5/2020 | Wilhelmsson | .......... | H04L 27/10 |

OTHER PUBLICATIONS

Xuan Fu, Zhiyong Feng, Yifan Zhang, Qixun Zhang, Wenjun Xu, Phase Difference Variance Based Low Complexity Spectrum Sensing Scheme, 2015 IEEE Global Communications Conference (GLOBECOM) (Year: 2015).*

* cited by examiner

*Primary Examiner* — Aristocratis Fotakis
(74) *Attorney, Agent, or Firm* — Banner & Witcoff, Ltd.

(57) ABSTRACT

A receiver, including: a sampling circuit configured to convert a received analog signal into a digital signal; a variance determination circuit configured to determine a phase difference variance of the digital signal; and a frequency shift keying (FSK) discrimination circuit configured to discriminate, based on the phase difference variance, whether the received analog signal is an FSK-modulated signal.

25 Claims, 3 Drawing Sheets

300A

300B

FREQUENCY SHIFT KEYING (FSK)-MODULATED SIGNAL DISCRIMINATION

TECHNICAL FIELD

The present disclosure generally relates to a receiver, and more specifically to a receiver for discriminating whether or not a received signal is a frequency shift keying-modulated signal.

BACKGROUND

Bluetooth low energy (BLE) uses Gaussian frequency shift keying (GFSK) modulation. A fast and reliable method for detecting whether or not a received signal is a GFSK-modulated signal is important for low-power receiver design. An existing Bluetooth packet detection scheme is based on pattern detection using correlators that correlate the received signal with possible GFSK patterns. This correlation scheme is complicated, consumes significant power, and has a high error rate. Another scheme based on signal strength cannot discriminate between a GFSK-modulated signal and co-channel interference. It also has a high false alarm rate in the presence of interference and high miss detection rate.

DESCRIPTION OF THE ASPECTS

The present disclosure is directed to a receiver configured to discriminate, based on a phase difference variance, whether a received analog signal is a frequency shift keying (FSK)-modulated signal, or is alternatively noise or a continuous wave signal.

Figure 1:
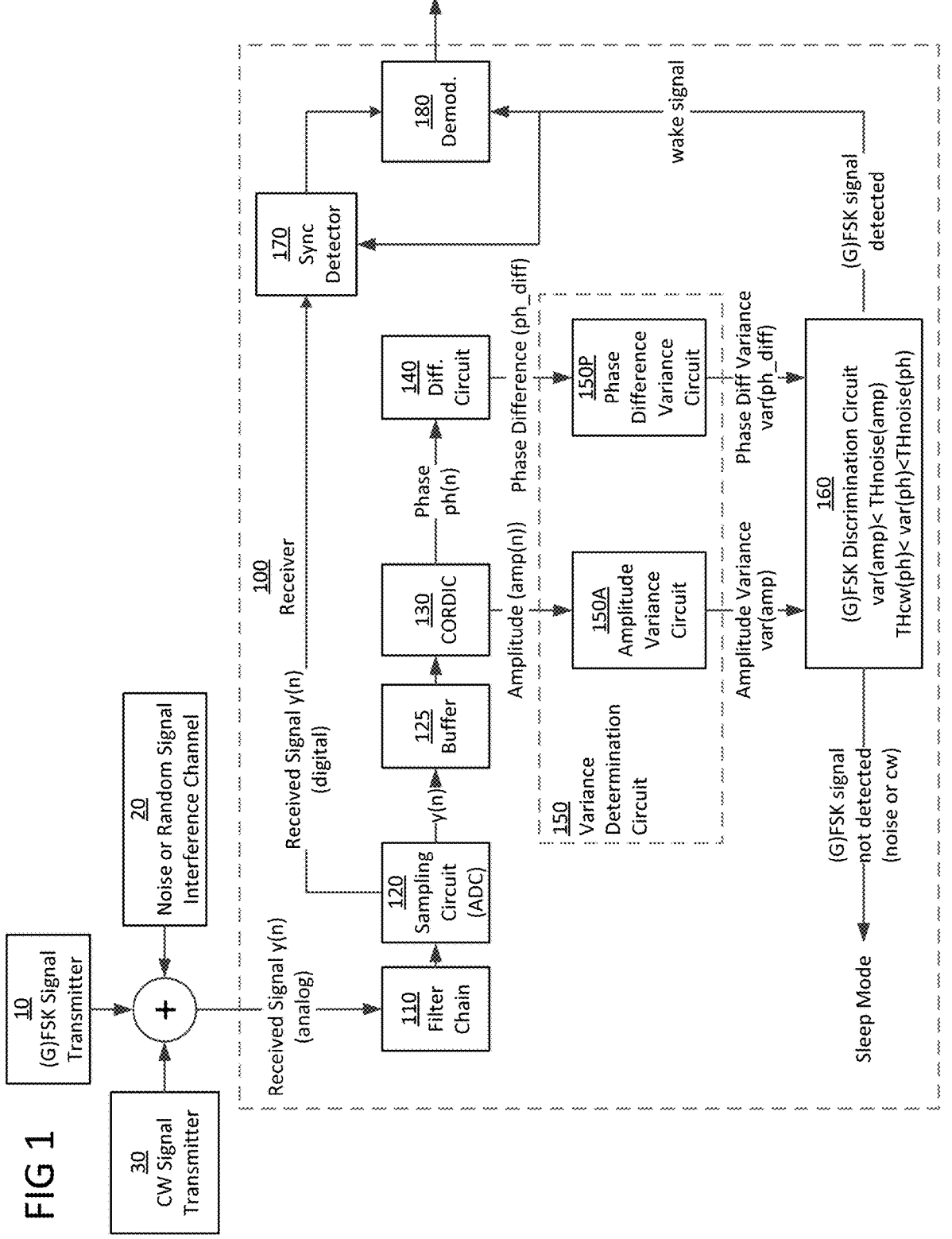
FIG. 1 illustrates a Bluetooth low energy (BLE) receiver in accordance with the disclosure.
Figure 2A:
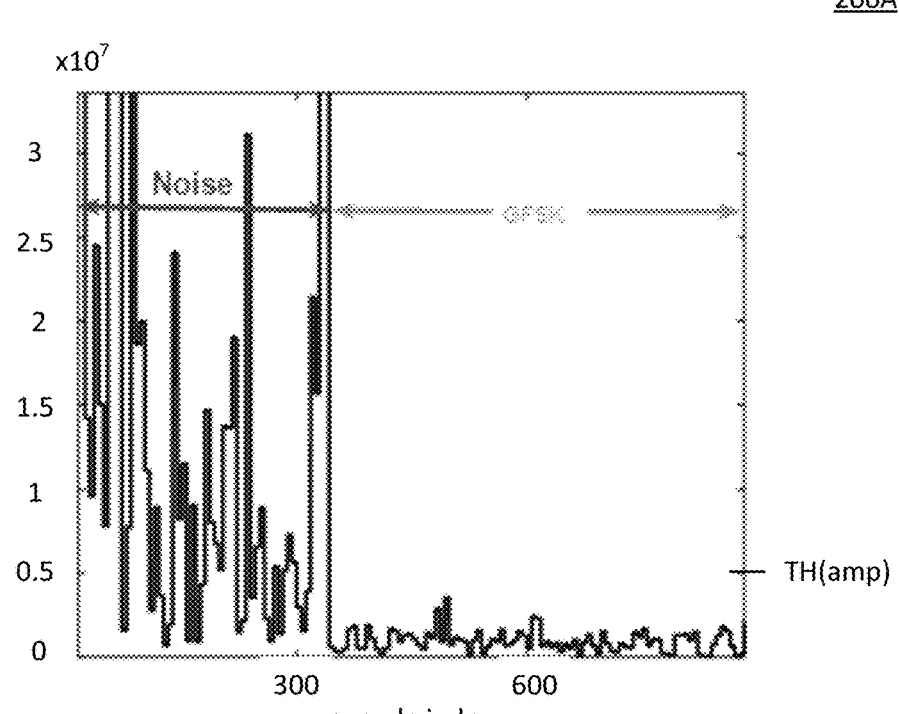
FIG. 2A illustrates a signal diagram of amplitude variance of samples.
Figure 2B:
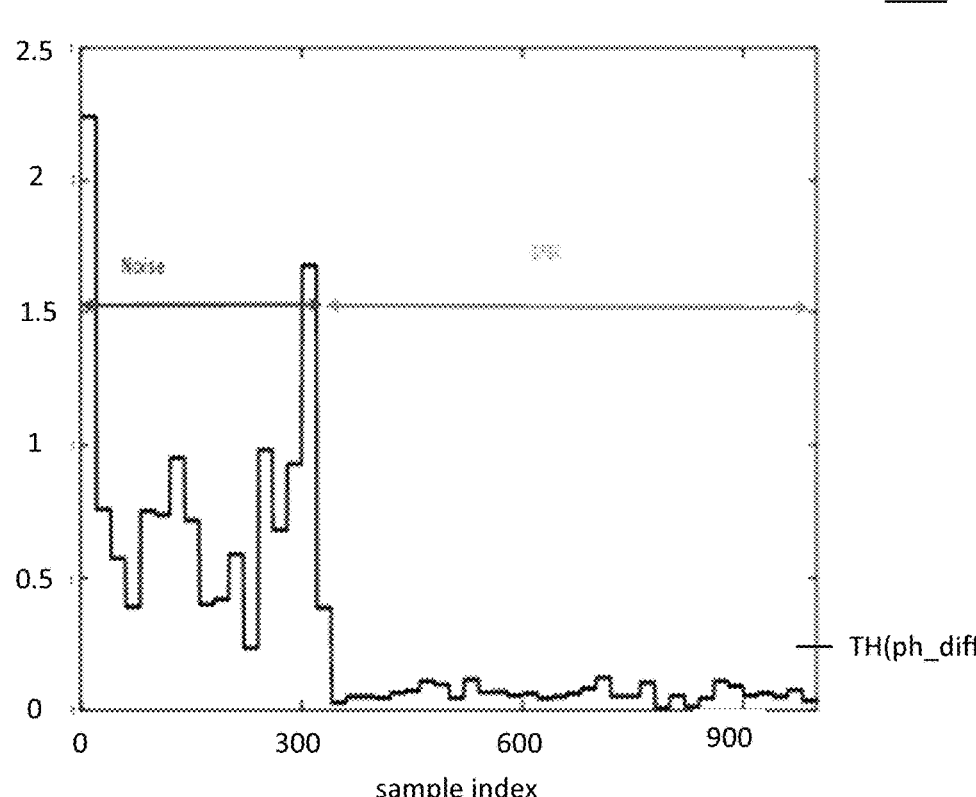
FIG. 2B illustrates a signal diagram of phase difference variance of samples.

FIG. 1 illustrates a Bluetooth low energy (BLE) receiver 100 in accordance with the disclosure. FIG. 2A illustrates a signal diagram 200A of amplitude variance var(amp) of samples. FIG. 2B illustrates a signal diagram 200B of phase difference variance var(ph_diff) of samples.

The (G)FSK transmitter 10 is configured to transmit to the receiver 100 a GFSK or FSK-modulated signal. The continuous wave (CW) signal transmitter 30 is configured to transmit a continuous wave signal. There is also a noise or random signal interference channel. A received signal y(n) received at the received 100 may be any one or more of a combination of these signal sources.

The receiver 100 comprises a filter chain 110, a sampling circuit 120, a buffer 125, a CORDIC 130, a differentiator circuit 140, a variance determination circuit 150, a frequency shift keying (FSK) discrimination circuit 160, a synchronization detector 170, and a demodulator 180.

The filter chain 110 comprises a series of filters to pre-process the received signal y(n) for down-sampling, In-phase/Quadrature (I/Q) imbalance compensation, group delay equalization, and amplitude equalization.

The sampling circuit 120 is configured to convert the received analog signal y(n) into a digital signal y(n). The digital signal has in-phase and quadrature components I/Q. In the figures and throughout this disclosure both the analog and digital versions of the received signal are represented as "y(n)", but it is understood that the sampling circuit 120 is the division between the analog and digital versions.

The CORDIC (COordinate Rotation DIgital Computer) 130 is configured to convert the complex I/Q received signal to a received signal phase ph(n) and amplitude amp(n). If the received signal y(n) is an FSK-modulated signal in base-band, then the phase ph(n) of the received signal is represented as:

$$ph(n) = \angle\{y(n) \cdot y^*(n-1)\} \overset{\text{def}}{=} \theta(n), \tag{1}$$

where * denotes complex conjugated, and $\angle$ denotes phase. The CORDIC 130 operates on a set of digital samples stored in the buffer 125.

The difference circuit 140 is configured to generate from the received signal phase differences ph_diff between consecutive samples of the received signal phase ph(n). And the absolute value of the amplitude amp(n) of the received signal y(n) is represented as:

$$amp(n) = ABS\{y(n)\}. \tag{2}$$

The variance determination circuit 150 comprises an amplitude variance circuit 150A and a phase difference variance circuit 150P, which may be combined or separate circuits. The phase variance circuit 150P is configured to determine a phase difference variance var(ph_diff) of the digital signal y(n) as follows:

$$var(ph) = E\{(ph - E\{ph\})^2\}, \tag{3}$$

where E denotes the expected or mean value, such as the average of the samples in the buffer 125.

The amplitude variance circuit 150A is configured to determine an analog difference variance var(amp) of the digital signal y(n) as follows:

$$var(amp) = E\{(amp - E\{amp\})^2\}. \tag{4}$$

The demodulator 180 is configured to demodulate data from the digital signal. And the synchronization detector 170 is configured to synchronize the demodulation of the digital signal.

The FSK discrimination circuit 160 is configured to discriminate whether the received analog signal y(n) is an FSK-modulated signal, noise (or random signal interference), or a continuous wave signal. Considering variations of phase and amplitude, there is a significant difference between noise and FSK-modulated signals. Noise generally differs from FSK-modulated signals in that each sample has independent and random amplitude and phase. FSK-modulated signal generally has the phases of two consecutive samples being almost the same. Furthermore, the FSK modulations are constant envelope, so the amplitude of the modulations remains constant. Typically continuous waves have a constant frequency and amplitude, and a relatively high amplitude. To detect a continuous wave, both the phase difference variance var(ph_diff) and the amplitude amp(n) are checked. Continuous waves, as compared with noise and (G)FSK-modulated signals, have a lower phase difference variance var(ph_diff).

The FSK discrimination circuit 160 may be any FSK-modulated discrimination circuit, such as a Gaussian frequency shift keying (GFSK) discrimination circuit. The FSK-modulated signal is a Bluetooth signal, and more specifically, may be a Bluetooth low energy (BLE) signal. In another aspect, the FSK-modulated signal is a ZigBee signal or a Global System for Mobile Communications (GSM) signal.

To distinguish between the received signal y(n) being an FSK-modulated signal, noise, and a continuous wave signal, thresholds are set based on a phase difference variance and amplitude variance. If the corresponding values of the received signal y(n) are greater than these thresholds, the received signal is noise. Based on the number of samples per symbol and system characteristics, this discrimination may be accomplished considering only one of these thresholds (phase or amplitude).

The FSK discrimination circuit 160 is configured to discriminate, based on the phase difference variance var (ph_diff), whether the received signal y(n) is an FSK-modulated signal. The received signal y(n) is an FSK-modulated signal when the phase difference variance var (ph_diff) is less than a noise phase difference variance threshold TH(ph_diff). In another aspect, the received signal y(n) is an FSK-modulated signal when the phase difference variance var(ph_diff) is less a noise phase difference variance threshold TH(ph_diff) and greater than substantially zero. In another aspect, the received signal y(n) is an FSK-modulated signal when the phase difference variance is below a noise phase difference variance threshold TH(ph_diff), and the amplitude variance var(amp) is substantially zero. In another aspect, the received signal y(n) is an FSK-modulated signal when the phase difference variance var(ph_diff) is less than a noise phase difference variance threshold TH(ph_diff) and greater than substantially zero, and the amplitude variance var(amp) is substantially zero.

"Substantially zero" throughout the disclosure means practically zero, but allowing for a reasonable amount of insignificant error. Also, values of the phase difference variance threshold TH(ph_diff) and the amplitude variance threshold TH(amp) are set based on system design.

The FSK discrimination circuit 160 is configured to discriminate that the received signal γ(n) is noise when the phase difference variance var(ph_diff) is greater than a noise phase difference variance threshold TH(ph_diff). In another aspect, the received signal y(n) is noise when the phase difference variance var(ph_diff) is above a noise phase difference variance threshold TH(ph_diff) and the amplitude variance is greater than a noise amplitude variance threshold TH(amp).

The FSK discrimination circuit 160 is configured to discriminate that the received signal γ(n) is a continuous wave signal when the phase difference variance var(ph_diff) is substantially zero. In another aspect, the received signal y(n) is a continuous wave signal when both the phase difference variance var(ph_diff) and the amplitude variance var(amp) are substantially zero.

The synchronization detector 170 and the demodulator 180 are significant power consumers. In order to save power, these components may be placed in a sleep mode (low power scan receiver mode) when not need to be enabled to process an FSK-modulated signal. If the (G)FSK discrimination circuit 160 discriminates that the received signal y(n) comprises a (G)FSK-modulated signal, the (G)FSK discrimination circuit 160 is configured to transmit a wake signal to the synchronization detector 170 and the demodulator 180 to wake them from a sleep mode to a wake mode (normal operating mode). Alternatively, if the received signal is noise or a continuous wave signal, the synchronization detector 170 and the demodulator 180 remain in sleep mode.

Figure 3A:
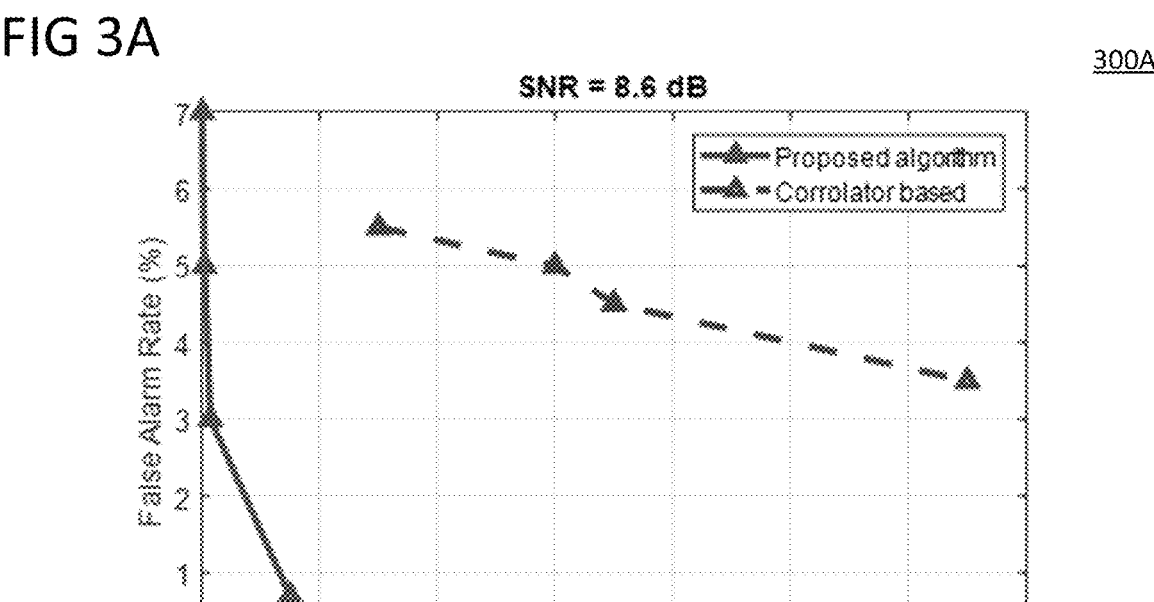
FIG. 3A illustrates a diagram illustrating a performance comparison between a correlator-based scheme and a phase difference variance scheme in accordance with the disclosure.
Figure 3B:
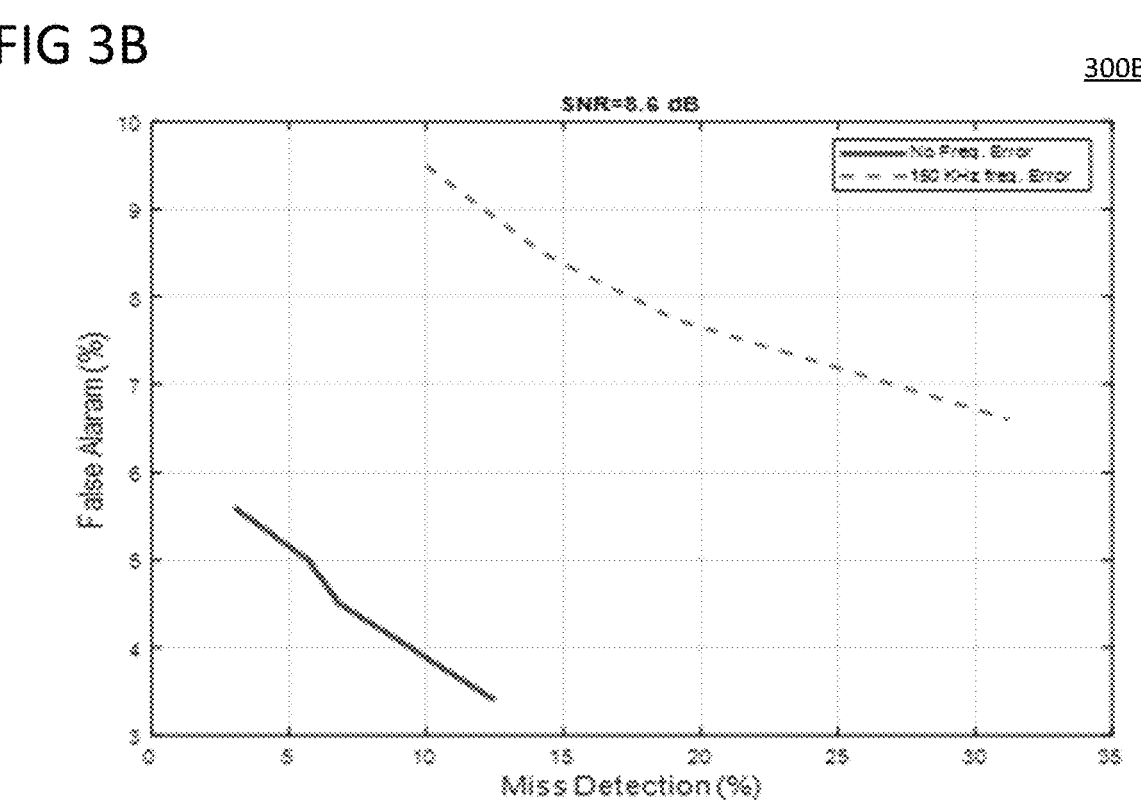
FIG. 3B illustrates a diagram illustrating a performance comparison between a correlator-based scheme having zero frequency offset and a 150 kHz frequency offset.

FIGS. 3A and 3B are diagrams 300 illustrating performance comparison (false alarm rate and miss detection rate) between the correlator-based scheme and the phase difference variance scheme in accordance with the disclosure.

FIG. 3A is a performance comparison when there is no frequency error. And FIG. 3B is a performance comparison when there is a 150 kHz frequency offset. Only five symbols with four samples per symbol (k=20) are considered. It can be seen that the phase difference variance scheme in accordance with this disclosure outperforms the correlator-based scheme.

Existing correlation-based approaches need to measure the frequency offset. The aspects of this disclosure are simpler because, in determining the variance, the frequency offset is removed. Variance with or without the frequency error $w_o$ is the same, evidenced as follows:

$$ph(n){=}\angle\{y(n){\cdot}e^{jw0n}{\cdot}y{*}(n{-}1){\cdot}e^{-jw0(n-1)}\}{=}\theta(n){+}w_0 \tag{5}$$

where $w_0$ is the constant frequency error, and $$\mathrm{var}(ph{+}w_0){=}E\{(\theta(n){+}w_0{-}E\{\theta(n){+}w_0\})^2\}{=}E\{(\theta(n){+} \\ w_0{-}E\{\theta(n)\}{-}w_0)^2\}{=}\mathrm{var}(ph), \tag{6}$$

and $$\mathrm{ABS}\{y(n){\cdot}e^{jw0n}\}{=}\mathrm{ABS}\{y(n)\} \tag{7}$$

The receiver 100 disclosed herein discriminates whether a received signal is a (G)FSK-modulated signal, noise, or a continuous wave signal in a low-complex, fast, and reliable manner, and based on a limited number of samples. The false alarm and miss detection rates are comparable to, and at times better than, the existing correlation scheme. The receiver 100 also performs the discrimination of the received signal independent of carrier frequency offset.

While the above description and figure may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

The techniques of this disclosure may also be described in the following examples.

Example 1. A receiver, comprising: a sampling circuit configured to convert a received analog signal into a digital signal; a variance determination circuit configured to determine a phase difference variance of the digital signal; and a frequency shift keying (FSK) discrimination circuit configured to discriminate, based on the phase difference variance, whether the received analog signal is an FSK-modulated signal.

Example 2. The receiver of example 1, wherein the FSK discrimination circuit is configured to discriminate that the received analog signal is an FSK-modulated signal when the phase difference variance is below a noise phase difference variance threshold.

Example 3. The receiver of example 1, wherein the FSK discrimination circuit is configured to discriminate that the received analog signal is an FSK-modulated signal when the phase difference variance is less a noise phase difference variance threshold and greater than substantially zero.

Example 4. The receiver of example 1, wherein the FSK discrimination circuit is configured to discriminate that the received analog signal is noise when the phase difference variance is greater than a noise phase difference variance threshold.

Example 5. The receiver of example 1, wherein the FSK discrimination circuit is configured to discriminate that the received analog signal is a continuous wave signal when the phase difference variance is substantially zero.

Example 6. The receiver of example 1, wherein the FSK discrimination circuit is configured to discriminate that the received analog signal is an FSK-modulated signal when the phase difference variance is below a noise phase difference variance threshold, and the amplitude variance is substantially zero.

Example 7. The receiver of example 1, wherein the FSK discrimination circuit is configured to discriminate that the received analog signal is an FSK-modulated signal when the phase difference variance is less than a noise phase difference variance threshold and greater than substantially zero, and the amplitude variance is substantially zero.

Example 8. The receiver of example 1, wherein the FSK discrimination circuit is configured to discriminate that the received analog signal is noise when the phase difference variance is above a noise phase difference variance threshold and the amplitude variance is greater than a noise amplitude variance threshold.

Example 9. The receiver of example 1, wherein the FSK discrimination circuit is configured to discriminate that the received analog signal is a continuous wave signal when the phase difference variance is substantially zero, and the amplitude variance is substantially zero.

Example 10. The receiver of example 1, further comprising: a demodulator configured to demodulate data from the digital signal; and a synchronization detector configured to synchronize the demodulation of the digital signal, wherein if the received analog signal is an FSK-modulated signal, the FSK discrimination circuit is configured to transmit a wake signal to wake the synchronization detector and the demodulator from a sleep mode to a wake mode.

Example 11. The receiver of example 10, wherein if the received analog signal is noise, the synchronization detector and the demodulator remain in the sleep mode.

Example 12. The receiver of example 1, wherein the FSK discrimination circuit is a Gaussian frequency shift keying (GFSK) discrimination circuit.

Example 13. The receiver of example 1, wherein the FSK-modulated signal is a Bluetooth signal.

Example 14. The receiver of example 1, wherein the FSK-modulated signal is a Bluetooth low energy (BLE) signal.

Example 15. The receiver of example 1, wherein the FSK-modulated signal is a ZigBee signal or a Global System for Mobile Communications (GSM) signal.

Example 16. A method, comprising: converting, by a sampling circuit, a received analog signal into a digital signal; determining, by a variance determination circuit, a phase difference variance of the digital signal; and discriminating, by a frequency shift keying (FSK) discrimination circuit, based on the phase difference variance, whether the received analog signal is an FSK-modulated signal.

Example 17. The method of example 16, wherein the discriminating that the received analog signal is an FSK-modulated signal is when the phase difference variance is below a noise phase difference variance threshold.

Example 18. The method of example 16, wherein the discriminating that the received analog signal is noise is when the phase difference variance is greater than a noise phase difference variance threshold.

Example 19. The method of example 16, wherein the discriminating that the received analog signal is a continuous wave signal is when the phase difference variance is substantially zero, and the amplitude variance is substantially zero.

Example 20. The method of example 1, wherein the FSK discrimination circuit is a Gaussian frequency shift keying (GFSK) discrimination circuit.

Example 21. A receiver, comprising: a sampling means for converting a received analog signal into a digital signal; a variance determination means for determining a phase difference variance of the digital signal; and a frequency shift keying (FSK) discrimination means for discriminating, based on the phase difference variance, whether the received analog signal is an FSK-modulated signal.

Example 22. The receiver of example 21, wherein the FSK discrimination means is for discriminating that the received analog signal is an FSK-modulated signal when the phase difference variance is below a noise phase difference variance threshold.

Example 23. The receiver of example 21, wherein the FSK discrimination means is for discriminating that the received analog signal is noise when the phase difference variance is greater than a noise phase difference variance threshold.

Example 24. The receiver of example 21, wherein the FSK discrimination means is for discriminating that the received analog signal is a continuous wave signal when the phase difference variance is substantially zero, and the amplitude variance is substantially zero.

Example 25. The receiver of example 21, wherein the FSK discrimination means is a Gaussian frequency shift keying (GFSK) discrimination means.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:
1. A receiver, comprising:
a sampling circuit configured to convert a received analog signal into a digital signal;
a variance determination circuit configured to determine a phase difference variance of the digital signal, wherein the phase difference variance is an average of squared deviations of phase differences from a mean; and
a frequency shift keying (FSK) discrimination circuit configured to discriminate, based on the phase difference variance, whether the received analog signal is an

FSK-modulated signal by comparing the phase difference variance to a noise phase difference variance threshold.

2. The receiver of claim 1, wherein the FSK discrimination circuit is configured to discriminate that the received analog signal is an FSK-modulated signal when the phase difference variance is below the noise phase difference variance threshold.

3. The receiver of claim 1, wherein the FSK discrimination circuit is configured to discriminate that the received analog signal is an FSK-modulated signal when the phase difference variance is less than the noise phase difference variance threshold and greater than substantially zero.

4. The receiver of claim 1, wherein the FSK discrimination circuit is configured to discriminate that the received analog signal is noise when the phase difference variance is greater than the noise phase difference variance threshold.

5. The receiver of claim 1, wherein the FSK discrimination circuit is configured to discriminate that the received analog signal is a continuous wave signal when the phase difference variance is substantially zero.

6. The receiver of claim 1, wherein the FSK discrimination circuit is configured to discriminate that the received analog signal is an FSK-modulated signal when the phase difference variance is below the noise phase difference variance threshold, and an amplitude variance is substantially zero.

7. The receiver of claim 1, wherein the FSK discrimination circuit is configured to discriminate that the received analog signal is an FSK-modulated signal when the phase difference variance is less than the noise phase difference variance threshold and greater than substantially zero, and an amplitude variance is substantially zero.

8. The receiver of claim 1, wherein the FSK discrimination circuit is configured to discriminate that the received analog signal is noise when the phase difference variance is above the noise phase difference variance threshold and an amplitude variance is greater than a noise amplitude variance threshold.

9. The receiver of claim 1, wherein the FSK discrimination circuit is configured to discriminate that the received analog signal is a continuous wave signal when the phase difference variance is substantially zero, and an amplitude variance is substantially zero.

10. The receiver of claim 1, further comprising:
a demodulator configured to demodulate data from the digital signal; and
a synchronization detector configured to synchronize the demodulation of the digital signal,
wherein if the received analog signal is an FSK-modulated signal, the FSK discrimination circuit is configured to transmit a wake signal to wake the synchronization detector and the demodulator from a sleep mode to a wake mode.

11. The receiver of claim 10, wherein if the received analog signal is noise, the synchronization detector and the demodulator remain in the sleep mode.

12. The receiver of claim 1, wherein the FSK discrimination circuit is a Gaussian frequency shift keying (GFSK) discrimination circuit.

13. The receiver of claim 1, wherein the FSK-modulated signal is a Bluetooth signal.

14. The receiver of claim 1, wherein the FSK-modulated signal is a Bluetooth low energy (BLE) signal.

15. The receiver of claim 1, wherein the FSK-modulated signal is a ZigBee signal or a Global System for Mobile Communications (GSM) signal.

16. A method, comprising:
converting, by a sampling circuit, a received analog signal into a digital signal;
determining, by a variance determination circuit, a phase difference variance of the digital signal, wherein the phase difference variance is an average of squared deviations of phase differences from a mean; and
discriminating, by a frequency shift keying (FSK) discrimination circuit, based on the phase difference variance, whether the received analog signal is an FSK-modulated signal by comparing the phase difference variance to a noise phase difference variance threshold.

17. The method of claim 16, wherein the discriminating that the received analog signal is an FSK-modulated signal is when the phase difference variance is below the noise phase difference variance threshold.

18. The method of claim 16, wherein the discriminating that the received analog signal is noise is when the phase difference variance is greater than the noise phase difference variance threshold.

19. The method of claim 16, wherein the discriminating that the received analog signal is a continuous wave signal is when the phase difference variance is substantially zero, and an amplitude variance is substantially zero.

20. The method of claim 16, wherein the FSK discrimination circuit is a Gaussian frequency shift keying (GFSK) discrimination circuit.

21. A receiver, comprising:
a sampling means for converting a received analog signal into a digital signal;
a variance determination means for determining a phase difference variance of the digital signal, wherein the phase difference variance is an average of squared deviations of phase differences from a mean; and
a frequency shift keying (FSK) discrimination means for discriminating based on the phase difference variance, whether the received analog signal is an FSK-modulated signal by comparing the phase difference variance to a noise phase difference variance threshold.

22. The receiver of claim 21, wherein the FSK discrimination means is for discriminating that the received analog signal is an FSK-modulated signal when the phase difference variance is below the noise phase difference variance threshold.

23. The receiver of claim 21, wherein the FSK discrimination means is for discriminating that the received analog signal is noise when the phase difference variance is greater than the noise phase difference variance threshold.

24. The receiver of claim 21, wherein the FSK discrimination means is for discriminating that the received analog signal is a continuous wave signal when the phase difference variance is substantially zero, and an amplitude variance is substantially zero.

25. The receiver of claim 21, wherein the FSK discrimination means is a Gaussian frequency shift keying (GFSK) discrimination means.

* * * * *